…

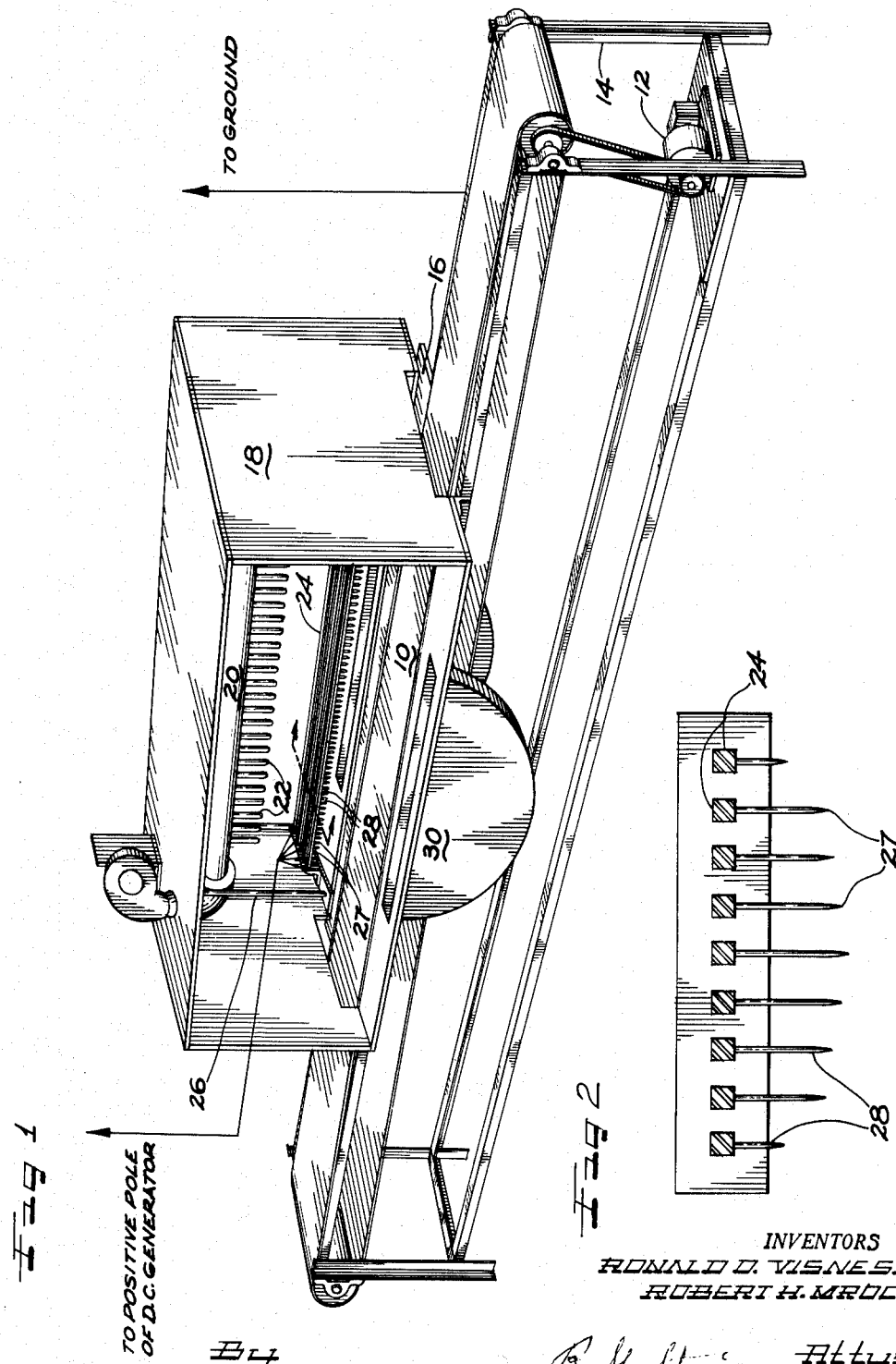

United States Patent Office 3,203,809
Patented Aug. 31, 1965

3,203,809
ELECTROSTATIC SMOKING
Ronald D. Visness, Park Forest, and Robert H. Mroch, Glen Ellyn, Ill., assignors to Swift & Company, Chicago, Ill., a corporation of Illinois
Filed May 2, 1962, Ser. No. 191,984
9 Claims. (Cl. 99—229)

The present invention relates to the smoking of foods. More specifically it relates to a method and apparatus for the electrostatic smoking of various food products, particularly meat products.

In the past, a large proportion of all smoked food, and particularly meat, was smoked during processing in a smoke house. This method is extremely slow, and new methods and apparatus for fast and effective smoking of meat and other food products have been long sought. Among the equipment proposed to overcome this problem have been electrostatic smokers, which cause ionization of the smoke particles and then precipitation of the ionized particles on the food to be smoked. However, much of the proposed equipment has been extremely complex and dangerous, with a multiplicity of electrodes located throughout the apparatus. The material to be smoked has at times itself been charged to facilitate smoking. Prior electrostatic equipment has generally been marked by inefficiency and instability of operation, arising largely from the use of inferior grids.

Because of the inferiority of these grids, the products have not been uniformly smoked and often have relatively heavy smoke deposits on some portions of the product and little or no smoke on other portions thereof. This made it necessary to use large excesses of smoke in order to adequately treat all portions of the product, with a resultant waste of much of the smoke, and the power necessary to supply it. This excess smoke also makes for poor working conditions. This necessity for using large amounts of smoke because of inefficient deposition has also greatly limited the amount of product which may be treated per unit time, and thereby has increased the unit cost of production.

Another shortcoming of the prior art electrostatic smokers has been their inability to deposit smoke over a large area. Thus conveyors and other product suppliers to the smoking unit have been limited in size, with a corresponding limitation on the amount of product which can be smoked per unit time.

It is therefore an object of this invention to provide an improved method for the electrostatic smoking of food products.

Another object of this invention is to provide an improved apparatus for the electrostatic smoking of food products.

A further object of this invention is to provide an improved apparatus having efficient and stable operating characteristics for the electrostatic smoking of foods.

An additional object of this invention is to provide an improved apparatus for ionizing particles of smoke and causing the ionized particles to come in contact with foods, thereby imparting a smoked taste to the food.

An additional object of the instant invention is to provide an apparatus for the electrostatic smoking of foods having an improved grid, and thereby to provide more efficient ionization, and uniform deposition of the smoke particles on the product being processed.

Still another object of this invention is to provide an improved grid element for an apparatus for the electrostatic smoking of food products.

Additional objects and advantages of the instant invention will be readily apparent to one skilled in the art from the following detailed description and the attached drawings.

In accordance with the present invention, smoke is passed through an electrical grid to the food being smoked. This electrical grid has a plurality of points or discharge members located on it, these points being so constructed that their locus describes a parabolic curved surface which enables corona discharge to be formed on all the points of the grid. All smoke particles are thus ionized as they pass through the grid, and are then attracted in the direction of the food. These ionized particles will strike the food and be uniformly deposited thereon to impart a uniform smoked taste throughout the food.

In the drawings:
FIGURE 1 is a perspective view of an embodiment of the instant electrostatic smoking apparatus with one side removed for clarity; and
FIGURE 2 is a cross-sectional view of the grid shown in FIGURE 1.

The instant method of smoking food is carried out by ionizing the smoke with corona discharge from an electrical grid or other suitable system. Subjecting the smoke to corona discharge results in a uniform ionization of substantially all of the smoke particles. The use of corona discharge sets up potential gradients between the smoke particles and the grid on the order of 160,000 to 500,000 volts per inch which cause uniform and efficient ionization of the particles. When an electrical grid is used in carrying out this method the required corona discharge can be achieved by supplying a high voltage to the grid, usually about 20,000 to 60,000 volts of positive D.C. potential. After the smoke has been ionized in the above manner, the ionized particles are attracted toward the food to be smoked and cause to strike or be precipitated uniformly on the food. The food thereby attains a uniform smoked taste. The product may be supplied in batch form, but is preferably supplied continuously to the smoking area and continuously removed therefrom. The time required for treatment is not critical and depends solely on the amount of smoke desired in the product. Thus the product should remain in the smoking area for a sufficient time to achieve the desired smoked taste.

FIGURE 1 of the drawings shows an embodiment of an apparatus for the electrostatic smoking of food products. This apparatus includes an endless belt conveyor 10, driven by a motor 12. The conveyor 10 and the motor 12 are supported by a stand 14. The stand is preferably constructed of a nonconductive material although it could obviously be readily constructed of metal. Stand 14 also supports a bed 16 which is located below a portion of the upper run of conveyor 10. This bed may be constructed of any conductor material such as steel or other metal. Bed 16 acts as an attracting means for the ionized smoke particles, causing the particles to be attracted toward the food to be smoked. Conveyor 10 itself could be constructed of a conductor material and serve as the attracting means, since the only requirement of the attracting means is that it is located below the path in which the food to be smoked is conveyed.

A housing 18 which covers the smoking unit is supported on bed 16. The housing may be constructed of a reinforced fiberglass material; or it could be of double wall construction, the inner wall being fiberglass and the outer wall being of any convenient material, with an insulating foam between the two shells. Although the housing could of course also be made of metal, it is preferred that only two elements in the entire apparatus are made of conductive material; namely, a grid 24 and either the bed 16 or the conveyor 10. This construction promotes migration of ionized smoke particles from the grid to the product on the conveyor.

The smoke distributing unit comprises a manifold 20 located near the top of housing 18, and a suitable smoke generating means, not shown, connected to manifold 20. Smoke from the manifold 20 is ejected into the housing through a plurality of nozzles 22 which are aimed downwardly at conveyor 10. The smoke is carried into the distributing manifold by a stream of air induced through the smoke-producing apparatus. The manifold 20 and nozzles 22 are preferably constructed of a nonconductive material such as polyvinyl chloride plastic.

The grid 24, containing a plurality of electrode element 28, is located between the manifold nozzles 22 and the conveyor 10, and is connected to a suitable source of electrical potential not shown. The distance between the grid 24 and conveyor 10 should generally be about one-half the distance between a surface of the housing wall and the closest point of the grid. When the grid is operating at about 20,000 to 60,000 volts the minimum distance between the conveyor and the closest point on the grid is about six inches. If the grid is spaced too close to the conveyor arcing will develop, but if it is spaced too far away the ionized field becomes distorted, and a loss of efficiency results. The optimum distance between the grid and the conveyor is about 8–9 inches where a four inch wire grid and a one foot wide conveyor are used. This distance gives a maximum spread of the smoke particles over the food on the conveyor. The distance between the tips of nozzles 22 and grid 24 has no specific limits, but should be sufficient to allow an even flow of smoke past the grid. A distance of three inches is satisfactory when a four inch grid is used.

The grid 24 is composed of a series of parallel spaced bars. The grid may be constructed of any conductor material, and may be of various dimensions. An elongated shape in the direction of the path of the food product is preferred. For example, a grid three feet long and four inches wide produced excellent results in the instant apparatus. This grid was composed of ¼-inch square parallel bars, spaced on ½-inch centers so as to leave gaps of ¼ inch between the bars. The electrode elements 28 were secured to these bars at ½ inch on center intervals. An apparatus, such as that illustrated, containing the foregoing grid was capable of adequately smoking 3600 lbs. per hour of pork and beef trimmings. A grid as wide as twelve inches may be used, but if a wider area of application is desired a multiple series of parallel grid units would be more efficient.

FIGURE 2 clearly shows the arrangement of the electrode elements 28 on grid 24. Electrode elements 28 which terminate at points 27, are of varying lengths with the length of the elements of the central bar of the grid being the greatest. The lengths of the elements are progressively shorter on each bar as the distance of the bar from the central bar increases, with the elements on the bars forming the opposite edges of the grid being the shortest of all. This configuration of the electrode elements of the grid allows the locus of their points 27 to describe an imaginary parabolic surface. This grid structure enables corona discharge to be achieved on all the points 27 of the grid 24. Corona discharge greatly improves the efficiency and stability of operation of the electrostatic smoking apparatus, and makes possible uniform deposition of the smoke particles and thus an evenly smoked product. Particularly good results are achieved using an elongated grid so that the locus of points 27 describes an imaginary cylindrical parabolic surface. This cylindrical parabolic configuration which is positioned so that the discharge portion of the grid presents a convex configuration to the pathway of the article to be smoked gives better ionization and more uniform deposition of smoke than any other shape tested.

The electrode elements 28 may be welded to the grid 24, or the parallel bars forming the grid may be drilled and threaded and the electrodes screwed into the bars. In other words, any mode of construction which makes the electrodes an integral part of the grid is suitable.

Referring again to FIGURE 1, a high voltage is supplied to the grid by a remote source of potential, not shown, in order to effect the desired corona discharge. This voltage may be on the order of 30,000 to 60,000 volts positive potential, but we have found that voltage in excess of about 20,000 volts is sufficient to produce the desired corona discharge on all the points 27 of electrode elements 28. The maximum voltage limitation depends only on the capacity of the equipment being used. The use of this high voltage to the grid further allows the remainder of the apparatus to be grounded; that is, the grid 24 is connected to the positive side of a D.C. generator and the bed 16 is connected to ground. The use of this high positive potential to ground system results in increased safety for operators. In systems using both positive and negative potentials, there are an increased number of "live" elements in the apparatus which could cause injury or death to an operator who touched them. In our apparatus only the grid 24, including of course electrode elements 28, are live and the remainder of the apparatus is grounded and may be touched without danger.

The grid 24 is suspended and insulated from the housing 18 by a number of nylon or other nonconductive rods 26.

An exhaust system 30 is located in the bottom of housing 18 and adjacent to conveyor 10, and is connected to a suitable pumping or blowing apparatus, not shown, to effect removal of excess smoke from the vicinity of the conveyor. The exhausting means, by removing the excess smoke from the vicinity of the conveyor, prevents the formation of an arc from the grid, and also aids in keeping the system clean. The exhaust means 30 may comprise a suction fan or any other suitable apparatus with an inlet in the vicinity of the conveying means.

In operation, the food to be smoked is fed to the smoking unit along a given path on conveyor 10. The smoke is produced by suitable smoke generating means and fed to manifold 20 by a blower or the like. An air stream from the smoke generator gives the smoke an initial velocity from the manifold in a direction toward the food containing conveyor by forcing the smoke through the plurality of nozzles 22 of the manifold. The smoke emitting from nozzles 22 passes through grid 24 where the smoke particles are ionized.

This ionization of the smoke particles is probably caused both by the collision of the particles with air molecules activated by the corona discharge from points 27, and by the pulling of electrons from the smoke particles by the grid. This latter electron stripping is caused by the strong potential gradients set up between the grid points 27 and the smoke particles, probably on the order of 160,000 to 500,000 volts per inch or higher.

The smoke particles after being ionized when passing through the grid are strongly attracted by bed 16 located below conveyor 10. The particles however are intercepted in their path to bed 16 by the mass of food on conveyor 10. The smoke is thereby deposited on the food and imparts a smoked taste to it.

It is obvious that the construction of stand 14 and housing 18 as shown in FIGURE 1 is purely a matter of choice, and many other types and shapes of structures could be substituted for the preferred embodiment shown there. The apparatus could be operative without a housing although this would probably lessen its efficiency.

Conveyor 10 need not necessarily be an endless belt conveyor. Any suitable conveying means may be used, depending on the type and amount of food product to be smoked.

The use of manifold 20 to supply smoke to the grid at a plurality of points through nozzles 22 results in increased efficiency of our apparatus. This increased efficiency is caused by the lowering of the particle density around the grid due to the smoke being supplied at a plurality of points uniformly distributed above the grid. The result is increased ionization efficiency and thus an increase in the amount of product which may be processed per unit time. Thus, while any suitable smoke supplying means may be used, the use of a manifold in conjunction with smoke generating means is preferred.

The use of the instant method and apparatus makes it possible to get uniform deposition of the smoke particles and thus an evenly smoked product. This uniform deposition of the smoke allows a greater amount of product to be processed with a given amount of smoke, thus decreasing the unit cost of the final product. The instant apparatus also allows smoke to be deposited uniformly over a greater area. This makes it possible to use conveying means of a greater capacity, and thus process more product in a given time.

The instant method and apparatus may be used to smoke practically any food product. Examples of foods which may be smoked with this metod and apparatus are fish; meat products such as table-ready meat emulsions or trimmings, hamburger patties, steaks, bacon and the like; vegetable products; and cheese. The products smoked in accordance with the instant invention may have a thickness of up to two inches or more.

Obviously, many modifications and variations of the invention as hereinbefore set forth may be made without departing from the spirit and scope thereof, and therefore only such limitations should be imposed as are indicated by the appended claims.

We claim:

1. A grid suitable for use in the electrostatic smoking of food products comprising: a series of spaced parallel bars, said bars being electrically connected to a remote source of electrical potential; and a plurality of electrode elements attached to each of said bars, said elements having varying lengths and terminating at points, with the locus of said points describing a convex parabolic surface.

2. A grid suitable for use in the electrostatic smoking of food products comprising: a series of parallel bars connected to a remote source of positive potential, one of said bars being a central bar located at approximately the center of said series of bars; and a plurality of electrode elements attached to each of said bars at spaced intervals thereon, said elements having varying lengths and terminating at points, with the lengths of said elements increasing as the distance between the central bar and the bar to which said elements are attached decreases and the locus of said points describing a parabolic curved surface.

3. A grid suitable for the electrostatic smoking of food products comprising: a series of parallel bars connected to a remote source of positive potential, said bars having lengths longer than the width of the entire grid, one of said bars being a central bar located at approximately the center of said series of bars; and a plurality of electrode elements having varying lengths and terminating at points; a number of said elements attached to each of said bars at spaced intervals thereon, the length of said elements increasing as the distance between said central bar and the bar on which said elements are located decreases, and the locus of said points forming a cylindrical parabolic surface.

4. A method for smoking food comprising: bringing the food to be smoked onto a given plane in a smoking area; establishing an ionizing field of corona discharge on a plurality of points describing an imaginary convex surface relative to said plane and spaced thereabove; and introducing a supply of smoke particles through said ionizing field towards said plane in a direction substantially normal thereto, whereby the smoke particles are ionized and attracted in the direction of the food.

5. A method for smoking food products comprising: continuously conveying the food to be smoked along a given plane in a smoking area; establishing an ionizing field of corona discharge on a plurality of points describing an imaginary convex surface spaced above said plane; and introducing a uniform distribution of smoke particles through said electrical field toward said plane in a direction substantially normal thereto, whereby said smoke particles are ionized and attracted in the direction of the food.

6. A method of smoking food products comprising: continuously passing the food to be smoked along a given plane in a smoking area; applying a positive potential of from about 20,000 to about 60,000 volts to points of an electrical grid, said points describing the locus of an imaginary convex parabolic cylinder spaced above said plane, thereby establishing a convex corona discharge relative to said plane; and introducing a uniform distribution of smoke particles through said corona discharge toward said plane in a direction substantially normal thereto, whereby said smoke particles are ionized and attracted in the direction of the food.

7. An apparatus for the electrostatic smoking of foods comprising: conveying means for conveying food to be smoked in a given path, said conveying means having transverse limits; downwardly aimed smoke supplying means located above said conveying means for emitting smoke particles in a direction toward said conveying means; a series of spaced parallel bars connected to a remote source of positive potential, said bars arranged parallel to the given path and spaced equally thereabove with a central bar centered over said conveying means and an outermost pair of said bars positioned substantially inwardly of the transverse limits of said conveying means; a plurality of electrode elements attached to each of said bars and terminating at points, the locus of said points describing a convex parabolic surface relative to the given path, said elements located on said bars to ionize smoke particles which pass therebetween; and a metal bed located below said conveying means for attracting the ionized smoke particles in said direction, whereby the particles are intercepted by the food on said conveying means.

8. An apparatus for the electrostatic smoking of foods comprising: conveying means for conveying food to be smoked in a given path, said conveying means having transverse limits; downwardly aimed smoke supplying means located above said conveying means for emitting smoke particles in a direction toward said conveying means; a series of parallel bars connected to a remote source of positive potential, said bars arranged parallel to the given path and spaced equally thereabove with a central bar centered over said conveying means and the outermost of said bars positioned substantially inwardly of the transverse limits of said conveying means; a plurality of electrode elements attached to each of said bars at spaced intervals thereon for ionizing said smoke particles, said elements having varying lengths and terminating at points, the lengths of said elements increasing as the distance between a central bar and the bar to which said elements are attached decreases and the locus of said points describing a parabolic curved surface; attracting means located below said path for attracting said particles in said direction, whereby said particles are intercepted by the mass of food on said conveying means; and exhausting means located adjacent to said conveying means for removing excess smoke particles from the vicinity of the conveying means.

9. An apparatus for the electrostatic smoking of meat comprising: an endless conveyor having parallel edges, for conveying meat in a given path; a manifold located above said conveying means for directing smoke downwardly in a direction towards said conveying means; smoke generating means operatively attached to said manifold, for supplying smoke to said manifold; a series of parallel bars connected to a remote source of positive potential, said bars arranged parallel to the given path and spaced equally thereabove with a central bar centered over said endless conveyor and the outermost of said bars positioned substantially inwardly of the parallel edges thereof; a plurality of electrode elements for ionizing the smoke particles, said elements having varying lengths and terminating at points, a number of said elements attached to each of said bars at spaced intervals thereon, the length of said elements increasing as the distance between said central bar and the bar on which said elements are located decreases, and the locus of said points forming a cylindrical parabolic surface; a metal bed located below said conveying means, for attracting said ionized smoke particles in said direction, whereby said particles are intercepted by the mass of meat on said conveying means; and exhausting means located adjacent to said conveying means, for removing excess smoke particles not deposited on said meat.

References Cited by the Examiner

UNITED STATES PATENTS

| | | | |
|---|---|---|---|
| 2,565,454 | 8/51 | MacKenzie et al. | 99—261 |
| 2,585,799 | 2/52 | Lawrence | 99—261 |
| 2,789,914 | 4/57 | Davis | 99—261 |
| 2,844,478 | 7/58 | Hanley et al. | 99—261 |
| 2,965,755 | 12/60 | West | 250—49.5 |

ROBERT E. PULFREY, *Primary Examiner.*

HYMAN LORD, JEROME SCHNALL, *Examiners.*